United States Patent
Poe et al.

(10) Patent No.: US 11,226,452 B2
(45) Date of Patent: Jan. 18, 2022

(54) DUAL POLARITY OPTICAL FIBER ADAPTOR WITH PROTRUDING TAB AND PATCH PANEL

(71) Applicant: Google LLC, Mountain View, CA (US)

(72) Inventors: Charles Poe, Palo Alto, CA (US); Mathew Berg, Charleston, SC (US); Jose Nazario, Ashburn, VA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/893,721

(22) Filed: Jun. 5, 2020

(65) Prior Publication Data
US 2021/0349266 A1 Nov. 11, 2021

Related U.S. Application Data

(60) Provisional application No. 63/022,630, filed on May 11, 2020.

(51) Int. Cl.
*G02B 6/38* (2006.01)

(52) U.S. Cl.
CPC .................. *G02B 6/3807* (2013.01)

(58) Field of Classification Search
CPC .................................... G02B 6/3807
USPC ....................................... 385/134
See application file for complete search history.

(56) References Cited

U.S. PATENT DOCUMENTS 5,142,597 A * 8/1992 Mulholland ......... G02B 6/3874
385/55
5,647,043 A 7/1997 Anderson et al.
5,687,268 A 11/1997 Stephenson et al.
(Continued)

FOREIGN PATENT DOCUMENTS

CN 101820121 A 9/2010
CN 104081241 A 10/2014
(Continued)

OTHER PUBLICATIONS

Reference number list for U.S. Patent Application Publication No. 2019/0243083 of Ninomiya et al. (Ninomiya) (Year: 2021).*
(Continued)

*Primary Examiner* — Andrew Jordan
(74) *Attorney, Agent, or Firm* — Lerner, David, Littenberg, Krumholz & Mentlik, LLP

(57) ABSTRACT

A dual polarity optical fiber adaptor that can accommodate and mate with optical fiber connectors with dual polarity is provided. In one example, a fiber optic adaptor module includes a housing having a top wall, a bottom wall, a first sidewall, and a second sidewall connecting the top wall and the bottom wall, the top and bottom walls and the first and second sidewalls defining an interior region in the housing, a partition wall disposed in the interior region connected between the top wall and the bottom wall, the partition wall defining one or more adaptors in the housing each having a connector connection port formed therein, wherein the partition wall has a center portion sandwiched between a first portion and a second portion, and a protruding tab formed in the center portion protruding outward from a first surface and a second surface of the first and the second portion, wherein the first and the second surfaces are vertically aligned.

20 Claims, 9 Drawing Sheets

(56) References Cited

U.S. PATENT DOCUMENTS

| | | | |
|---|---|---|---|
| 6,364,537 B1* | 4/2002 | Maynard | G02B 6/3831 |
| | | | 385/55 |
| 7,418,184 B1 | 8/2008 | Gonzales et al. | |
| 8,676,022 B2 | 3/2014 | Jones | |
| 8,747,150 B1 | 6/2014 | Lin | |
| 9,128,255 B2* | 9/2015 | Sato | G02B 6/3849 |
| 9,268,103 B2 | 2/2016 | Nguyen et al. | |
| 9,429,251 B1 | 8/2016 | Lin | |
| 9,465,172 B2 | 10/2016 | Shih | |
| 9,625,658 B1 | 4/2017 | Lin | |
| 10,228,516 B2 | 3/2019 | Veatch et al. | |
| 10,871,619 B2* | 12/2020 | Ninomiya | G02B 6/4453 |
| 2001/0026661 A1 | 10/2001 | de Jong et al. | |
| 2010/0032276 A1 | 2/2010 | Arai | |
| 2014/0003782 A1 | 1/2014 | Blackwell, Jr. et al. | |
| 2014/0226946 A1 | 8/2014 | Cooke et al. | |
| 2015/0078710 A1* | 3/2015 | Sato | G02B 6/3849 |
| | | | 385/78 |
| 2015/0293311 A1 | 10/2015 | Coffey et al. | |
| 2017/0205586 A1 | 7/2017 | Chang et al. | |
| 2017/0248762 A1* | 8/2017 | Sato | G02B 6/3897 |
| 2018/0217338 A1* | 8/2018 | Takano | G02B 6/3893 |
| 2019/0243083 A1* | 8/2019 | Ninomiya | G02B 6/4453 |
| 2019/0271816 A1* | 9/2019 | Wong | G02B 6/3869 |
| 2019/0339465 A1 | 11/2019 | Murray et al. | |
| 2020/0386967 A1* | 12/2020 | Ninomiya | G02B 6/3825 |

FOREIGN PATENT DOCUMENTS

| | | |
|---|---|---|
| CN | 203981920 U | 12/2014 |
| CN | 106980157 A | 7/2017 |
| TW | M487444 U | 10/2014 |
| WO | 2013109469 A1 | 7/2013 |

OTHER PUBLICATIONS

Reference number list for U.S. Pat. No. 6,364,537 of Maynard (Maynard) (Year: 2021).*

Reference number list for U.S. Appl. No. 16/893,721 of Poe et al. (Poe, the present application) filed 2021.*

Partial European Search Report for European Patent Application No. 20211893.1 dated Apr. 30, 2021. 11 pages.

Extended European Search Report for European Patent Application No. 20211893.1 dated Aug. 2, 2021. 10 pages.

Office Action for Chinese Patent Application No. 202011056877.4 dated Oct. 19, 2021. 12 pages.

* cited by examiner

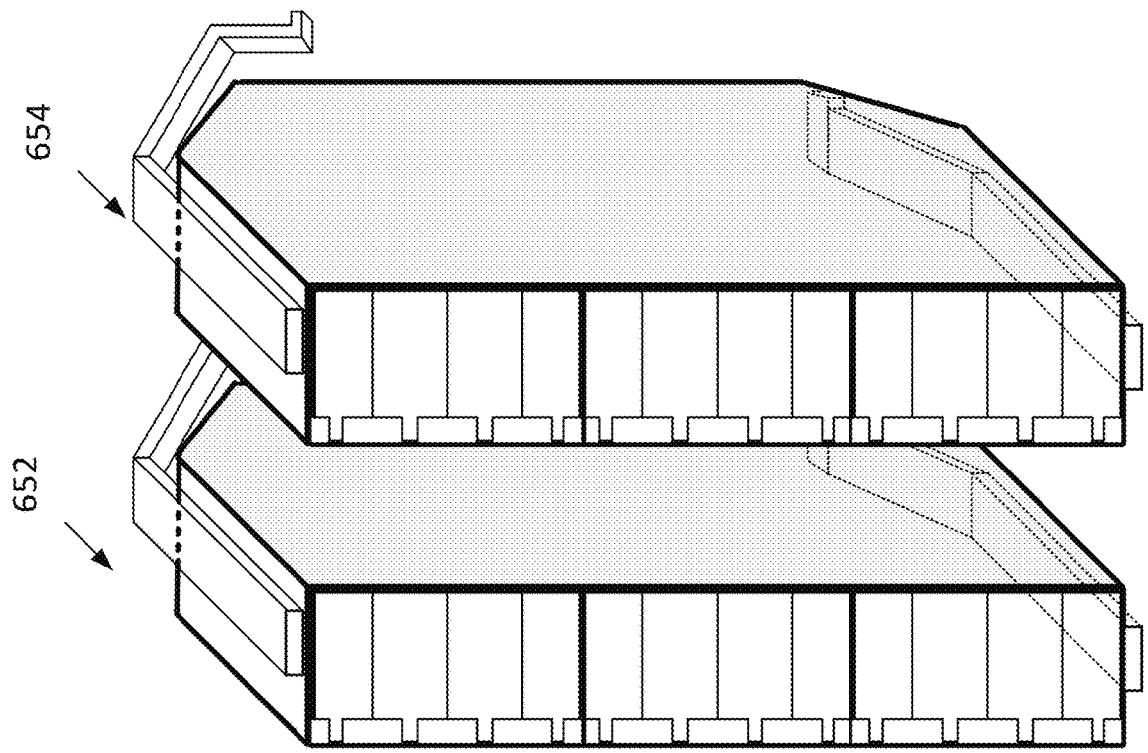
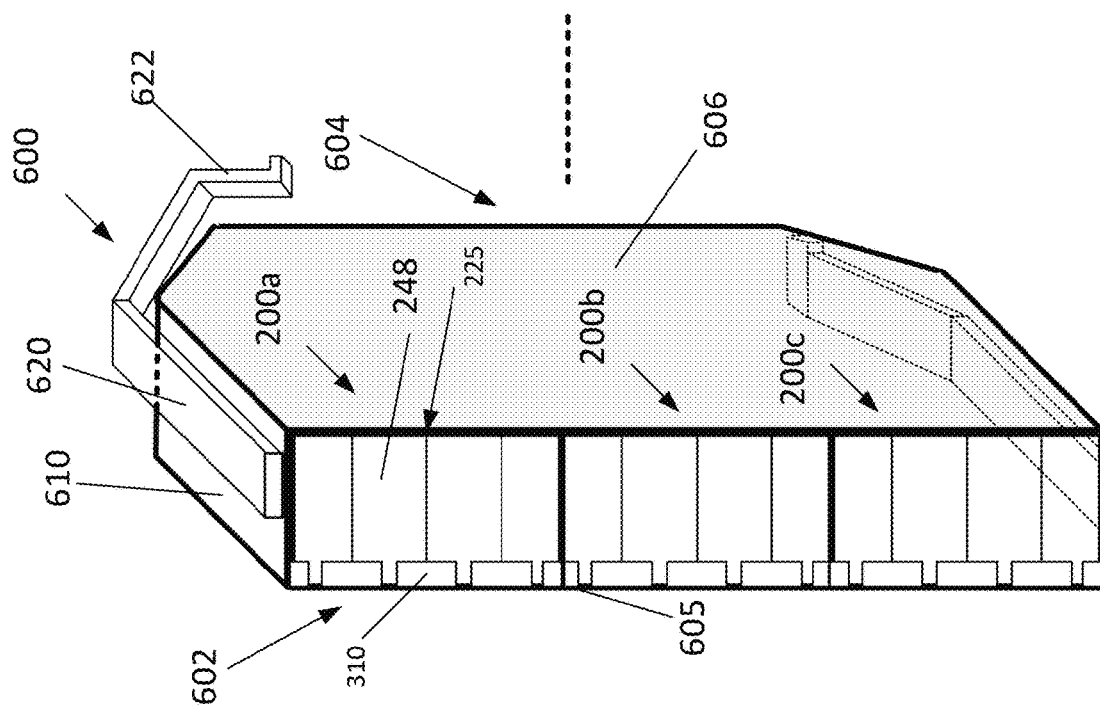
FIG. 6

DUAL POLARITY OPTICAL FIBER ADAPTOR WITH PROTRUDING TAB AND PATCH PANEL

CROSS-REFERENCE TO RELATED APPLICATION

This application claims the benefit of the filing date of U.S. Provisional Patent Application No. 63/022,630 filed May 11, 2020, the disclosure of which is hereby incorporated herein by reference.

BACKGROUND

The capabilities of optical fiber, optical cable and fiber optic hardware have been continuously advanced to meet the demands of increasing numbers of users. The conventional duplex fiber optic connector has a switchable polarity. The duplex fiber optic connector typically includes a housing, a removable trigger mechanism, such as a latch, and first and second fiber optic connector assemblies that have different polarity configurations. The removable trigger mechanism is often slidably and detachably sleeved on the housing to engage releasably the first and second fiber optic connector assemblies so as to prevent rotation of the first and second fiber optic connector assemblies relative to the housing, and in turn, undesired polarity reversal. The polarity reversal is usually accomplished by removing the removable trigger mechanism from the housing, followed by rotating the first and second fiber optic connector assemblies and re-installing the removable trigger mechanism on a reverse side of the housing.

After the polarity reversal, the first and second fiber optic connectors are inserted into an adapter. The adaptor may then mate the fiber optic connectors to corresponding fiber optic cables associated therewith. The adaptor may be mounted in a patch panel within an enclosure. However, after rotation of the polarity reversal, the geometry of the housing of the duplex fiber optic connector may not be properly fit into the adaptor. Conventional adaptors are generally configured for one or the other polarity. Thus, an operator is often required to remove the original adaptor and utilize a reverse-polarity adaptor to reconnect the fiber optic connectors after the polarity reversal. Such replacement is a cumbersome process and labor intensive. In some situations, system centers, such as data communication centers, computer centers, information centers and the like, are required to store various adaptors with different polarity configurations for different polarity configuration requirements, which increases burden in inventory stock, storage space and associated costs.

BRIEF SUMMARY

A dual polarity optical fiber adaptor that can accommodate and mate with optical fiber connectors with dual polarity in any polarity configuration is provided. In one example, the fiber optic adaptor module includes a housing having a top wall, a bottom wall, a first sidewall, and a second sidewall connecting the top wall and the bottom wall, the top and bottom walls and the first and second sidewalls defining an interior region in the housing, a partition wall disposed in the interior region connected between the top wall and the bottom wall, the partition wall defining one or more adaptors in the housing each having a connector connection port formed therein, wherein the partition wall has a center portion sandwiched between a first portion and a second portion, and a protruding tab formed in the center portion protruding outward from a first surface and a second surface of the first and the second portion, wherein the first and the second surfaces are vertically aligned.

In one example, the first portion of the partition wall horizontally defines a first slot in the connector connection port and the second portion in the partition wall horizontally defines a second slot in the connector connection port. The center portion in the partition wall horizontally defines a center slot between the first and the second slots. The first and the second slots are configured to receive a latch from a fiber optic connector. The center slot is configured to receive a connector assembly from a fiber optic connector.

In one example, the fiber optic connector is a dual polarity optic connector. The protruding tab has a width between about 1 mm and about 100 mm. The first and the second surfaces have a curved surface. In one example, a front section connected to a rear section, wherein the front section comprises a front surface having the connector connection port formed therein. The rear section comprises one or more cable connection ports formed therein. The rear section is removable from the front section. The cable connection ports are in connection with the connector connection port in the housing. Three partition walls are formed in the interior region, defining four adaptors in the housing.

In one example, the fiber optic connector further includes a marking section formed at one end of the partition wall.

Another aspect of the disclosure provides an adaptor includes a housing having a top wall, a bottom wall, a first sidewall, and a second sidewall connecting the top wall and the bottom wall, the top and bottom walls and the first and second sidewalls defining an interior region in the housing, wherein the first and the second walls each has a center portion sandwiched between a first portion and a second portion, and a protruding tab formed in the center portion protruding outward from a first surface and a second surface of the first and the second portion, wherein the first and the second surfaces are vertically aligned, wherein the first and the second surface are curved and geometrically identical.

In one example, the adaptor is configured to mate with a dual polarity optic connector with either standard polarity configuration or reversed polarity configuration. The first portion horizontally defines a first slot and the second portion in the partition walls horizontally defines a second slot. The center portion horizontally defines a center slot between the first and the second slots. The first and the second slots are configured to receive a latch from a fiber optic connector and the center slot is configured to receive a connector assembly from the fiber optic connector.

Another aspect of the disclosure provides a method for connecting a fiber optic connector to an adaptor includes mating a connector assembly of a fiber optical connector to a center slot of an adaptor, and mating a latch of the fiber optical connector to a first slot of the adaptor, wherein the first slot is disposed on a first side of the center slot, leaving a second slot disposed on a second side of the center slot unconnected in the adaptor.

BRIEF DESCRIPTION OF THE DRAWINGS

FIG. 6 depicts a front view of an example fiber optic assembly.

DETAILED DESCRIPTION

This disclosure provides a dual polarity adaptor for fiber optic interconnection. The dual polarity adaptor has multiple slots defined in a connector connection port in the adaptor. The multiple slots are configured to mate with a fiber optic connector with any polarity configuration, such as standard or reversed polarity configurations. The multiple slots defined in the dual polarity adaptor may accommodate different orientations and geometrical configurations of the fiber optical connector 100 with different polarity configurations. The dual polarity adaptor may be utilized in a fiber management system, such as a patch panel, to provide connecting ports that can accept a dual polarity fiber optic connector in both straight polarity and reverse polarity. Thus, the need for ordering different types of adaptors with different polarity configurations and fiber management system to mate with the fiber optic connectors with different polarity configurations may be eliminated. Accordingly, the labor and cost for fiber optic management is reduced and the footprint required to place adaptors with different polarity configurations may be eliminated as the multiple slots defined in the dual polarity adaptor can accommodate the dual polarity connectors with any polarity configurations.

Figure 1A:
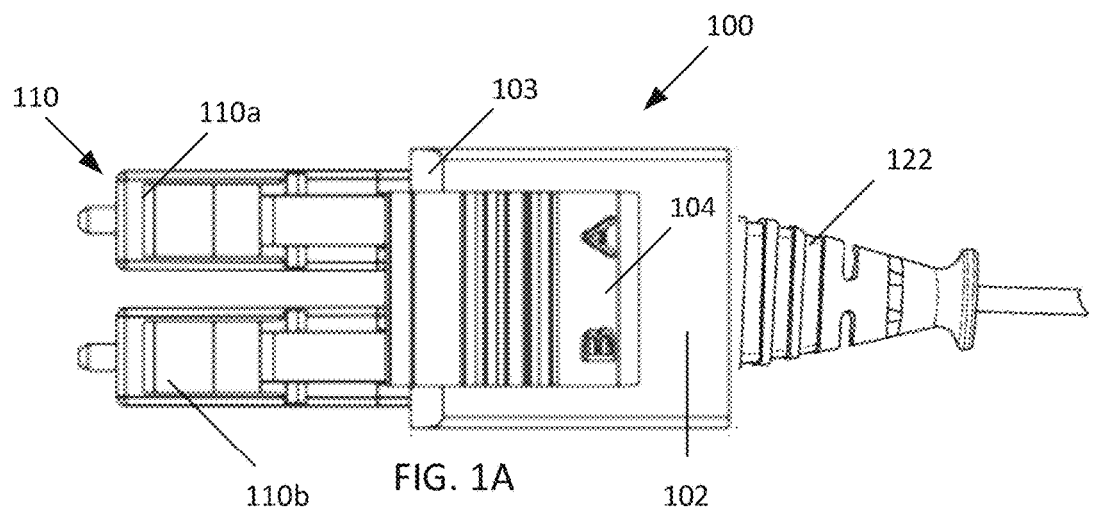
FIGS. 1A-1C depicts an example of a fiber optic connector according to aspects of the disclosure.
Figure 1B:
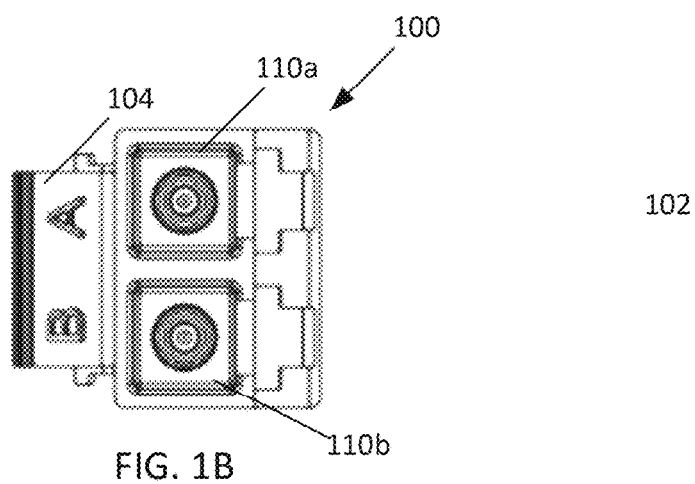
Figure 1C:
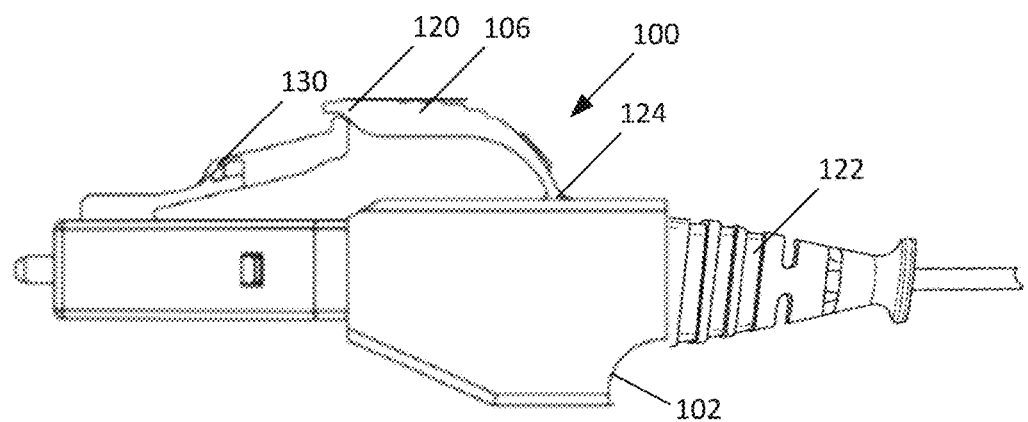

FIGS. 1A-1C depict an example of a fiber optic connector 100 that provides dual polarity configurations. FIG. 1A depicts a top view of the fiber optic connector 100. The fiber optic connector 100 comprises a body 102 that has two connector assemblies 110 (shown as 110a, 110b) connected thereto. FIG. 1B depicts a front view of the fiber optic connector 100 illustrating the two connector assemblies 110 (shown as 110a, 110b) formed at a front section 103 of the fiber optical connector 100. Connector polarity indicia 104 is formed in the body 102 that indicates the polarity of the connector 100. The body 102 encases two optical fibers connecting to the two connector assemblies 110a, 110b respectively. The two optical fibers enclosed in the body 102 are connected to a cable 122 connected to the body 102. FIG. 1C depicts a side view of the fiber optic connector 100. A latch 106 has a first end 120 connected to the connector assemblies 110a, 110b through a spring latch arm 130 and a second end 124 connected to the body 102. The latch 106 is used to secure the fiber optical connector 100 to an adaptor. The spring latch arm 130 releasably engages the latch 106. The spring latch arm 130 may be pressed to disengage from the latch 106. When the spring latch arm 130 is released and disengaged from the latch 106, the connector assemblies 110a, 110b may be inserted into an adapter in a predetermined insertion direction. The adaptor may be disposed in a chassis (not shown) mounted in a fiber management system. The latch 106 abuts against the spring latch arm 130 connected to the connector assemblies 110a, 110b for manually pressing the latter to move downwardly to allow disengagement between the connector assemblies 110a, 110b and the adapter and removal of the connector assemblies 110a, 110b out of the port. When a reversal of the polarity configuration is desired, the spring latch arm 130 may be pressed to discharge the connector assemblies 110a, 110b from the body 102. The connector assemblies 110a, 110b may then be flipped and rotated for 180 degrees for polarity reversal and the latch 106 will then be re-attached to the opposite site of the body 102. Details of the adaptor that may be utilized to mate with the fiber optical connector 100 with dual polarity is illustrated Figure below in detail with references to FIGS. 2A-3B.

FIGS. 2A-2D depict a perspective view, a side view, a rear end view and a top view, respectively, of an adaptor module 200 in accordance with an example of the present disclosure. The adaptor module 200 includes a plurality of adaptors 250. The adaptor 250 is a dual polarity adaptor that may accommodate different orientations and geometrical configurations of the fiber optic connector 100 with different polarity configurations. In the example depicted in FIG. 2A, the adaptor module 200 includes four adaptors 250 connected together, such as in a line or stack, so as to save space and maximize the usage of the space among the adaptors 250. It is noted that the adaptor module 200 may have any numbers of the adaptors 250, such as at least one, at least two, at least three, at least four, at least five, at least six, or other numbers, as needed for different configurations of the patch panel on where the adaptor module 200 is configured to be mounted. It is noted that the density of fiber interconnection may be maximized by utilizing multiple adaptor modules 200 to be disposed side-by-side with multiple arrays. In this manner, the adaptor modules 200 are abutting one another in adjacent rows and adjacent columns, thus eliminating wasted space from between adjacent rows and adjacent columns, and providing a maximum density of connection adaptors 250 for the available opening space in the patch panel. In one example, the adaptor module 200 may be configured with any angular configuration to provide any connection orientation angle with respect to the patch panel.

The adaptor 250 is configured to mate with a fiber optical connector, such as the fiber optical connector 100 depicted in FIGS. 1A-1C with different polarity configurations. It is noted that the adapter 250 may be mated with other types of the fiber optical connector as needed when the geometric configurations of the fiber optical connector can fit in the slot and/or ports defined in the adaptor 250.

Figure 2A:
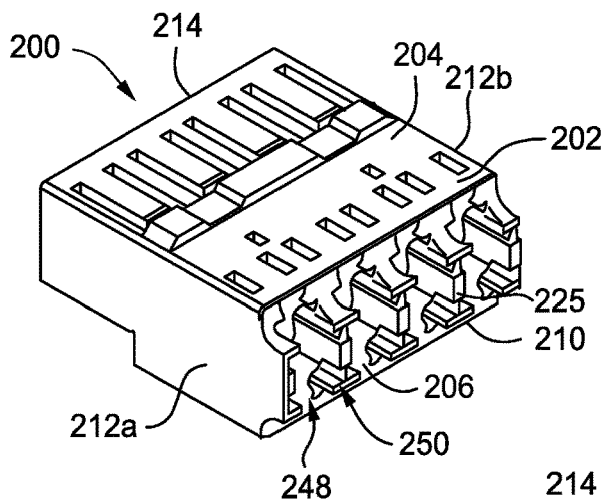
FIGS. 2A-2D depicts an example of an adaptor according to aspects of the disclosure.

In one example depicted in FIG. 2A, the adaptor module 200 includes a housing 202 having a top wall 204, a bottom wall 210, a first sidewall 212a, and a second sidewall 212b connecting the top wall 204 and the bottom wall 210. The top wall 204, the bottom wall 210, the first and second sidewall 212a, 212b define an interior region 206, such as a passage. The interior region 206 of the housing 202 is divided by a plurality of partition walls 225, defining multiple adaptors 250 with multiple connector connection ports 248 therein. The partition wall 225 is connected from the top wall 204 to the bottom wall 210. Each connector connection port 248 is configured to receive a fiber optical connector, such as the fiber optical connector 100 depicted in FIG. 1A-1D. Each adaptor 250 defined in the adaptor module 200 may be symmetrically identical, and the first and second sidewalls 212a, 212b may also be symmetrically identical, such that upon rotation of the adaptor module 200 along with its longitudinal axis, the tops and bottoms are interchangeable.

The adaptor 250 may serve as a termination point between an incoming fiber optic cable connected through a rear section 214 of the adaptor module 200 and an outgoing fiber optic cable, such as the cable 122, connected through the fiber optical connector 100.

Although the example depicted herein has four adaptors defined in an adaptor module, it is noted that the numbers of the adaptors formed, configured in, or connected to form an adaptor module may be in any numbers as needed.

The top wall 204, the bottom wall 210, the first and second sidewalls 212a, 212b of the housing 202 as well as the partition walls 225 may be integrally formed as an integral body from a polymeric material, such as molded plastic.

Figure 2B:
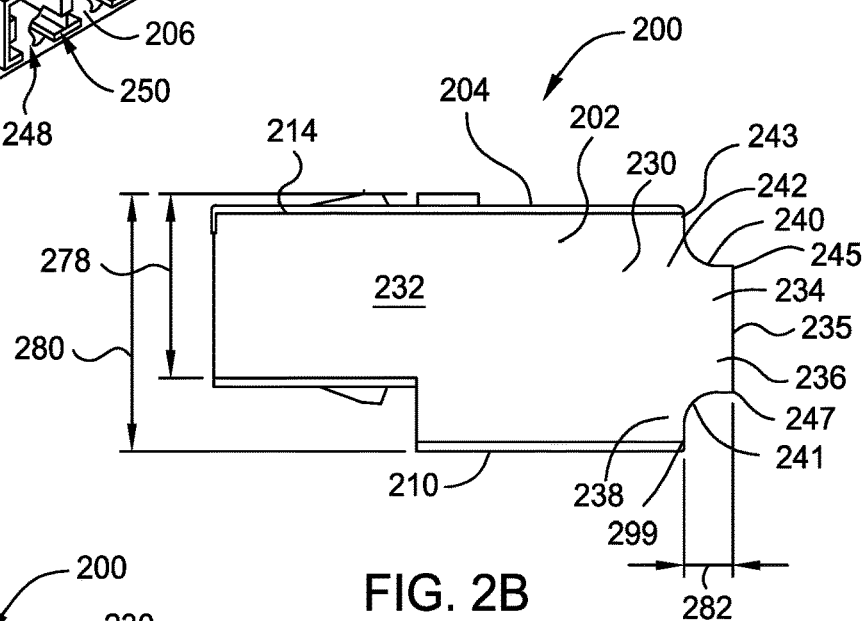

FIG. 2B depicts a side view of the adaptor module 200. A front section 230 of the adaptor module 200 has the connector connection ports 248 defined therein configured to receive the fiber optical connector 100. The front section 230 of the adaptor module 200 has a protruding tab 234 projecting outward from a center portion 236 between a first portion 242 and a second portion 238. The first portion 242 is vertically above the second portion 238 across the center portion 236 when the bottom wall 210 is referenced as a horizonal base surface. The first portion 242 and the second portion 238 each define a first surface 240 and a second surface 241 formed inward from an outer center surface 235 defined by the protruding tab 234.

The first surface 240 may have a curved surface extending from a first tip 245 of the center portion 236 to a top edge 243 of the first portion 242. Similarly, the second surface 241 may have a curved surface extending from a second tip 247 of the center portion 236 to a bottom edge 299 of the second portion 238. The curvature of the first and the second surfaces 240, 241 are substantially identical and symmetrical. Thus, in one example, the first and the second surface 240, 241 are geometrically identical. The curved surface of the first and the second surfaces 240, 241 may facilitate finger gripping the structures inserted therein, such as engagement or disengagement of a latch from a fiber optical connector from the first portion 242 and the second portion 238. A width 282, such as a width of the protruding tab 234, between about 1 mm and about 100 mm, may be defined between the outer center surface 235 of the protruding tab 234 and the top edge and bottom edge 243, 299 of the first and the second portions 242, 238. Details structures of the adaptor 250 will be described below with reference to FIGS. 3A-3B.

As discussed above, the adaptor module 200 has the rear section 214 enclosing multiple cable ports 232 configured to receive the fiber optic cables through additional connector structures as needed. In one example, the front section 230 may have a first height 280 across the housing 202 in a range between about 5 mm and about 50 mm, such as between about 8 mm and about 22 mm. The rear section 214 may have a second height 278 across the housing 202 in a range between about 3 mm and about 35 mm, such as between about 4 mm and about 22 mm. In one example, the first height 280 may be between about 30 percent and about 60 percent greater than the second height 278.

Figure 2D:
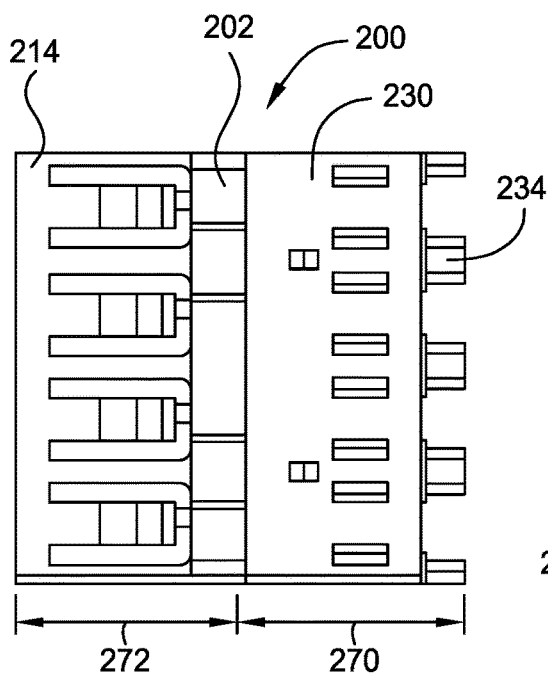
Figure 2C:
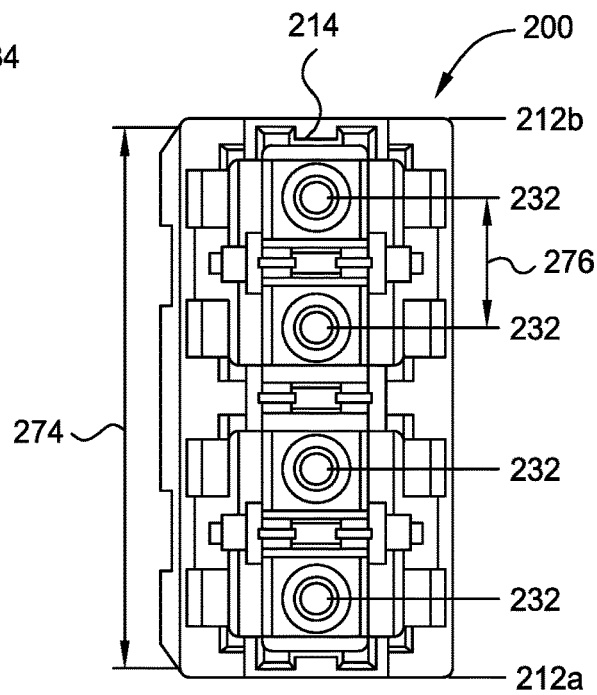

FIG. 2C depicts a rear end view of the adaptor module 200. The cable ports 232 are formed in the rear section 214 of the adaptor module 200 defined in each adaptor 250. A distance 276 between about 3 mm and about 15 mm, may be defined between center points of the cable ports 232. The adaptor module 200 may have a width 274 from the first and second sidewalls 212a, 212b between about 10 mm and about 80 mm, such as between about 15 mm and about 40 mm.

FIG. 2D depicts a top view of the adaptor module 200. The rear section 214 and the front section 230 may be interlocked by a locking mechanism. In some examples, the rear section 214 may be removable from the front section 230 or vice versa, for ease of installation. In some examples, the rear and front sections 214, 230 may be permanently secured and connected to each other as needed. In one example, the front section 230 has a first longitudinal length 270 between about 5 mm and about 50 mm, such as about 10 mm and about 30 mm. The rear section 214 has a second longitudinal length 272 between about 5 mm and about 50 mm, such as about 10 mm and about 30 mm.

In the example wherein only one adaptor 250 is utilized, the partition wall 225 may be eliminated and the first portion 242, second portion 238 and the center portion 236 may be formed in the first and the second exterior sidewalls 212a, 202b of the housing 202. Similarly, the protruding tab 234 projecting outward from the center portion 236 between the first portion 242 and the second portion 238 is defined in the first and the second sidewalls 212a, 212b. The first portion 242, second portion 238 and the center portion 236 each horizontally define a first slot, a second slot and a center slot formed therebetween. The slots can receive the fiber optical connector 100 in the similar manner described above.

Figure 3A:
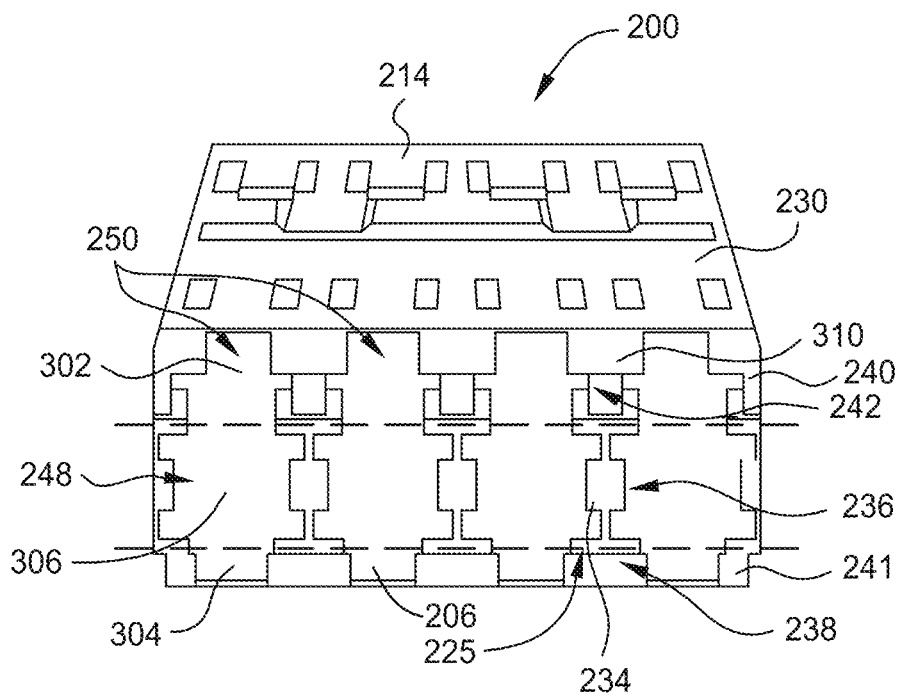
FIGS. 3A-3B depicts an example of a front view and a back view of the adaptor of FIG. 2A-2D according to aspects of the disclosure.
Figure 3B:
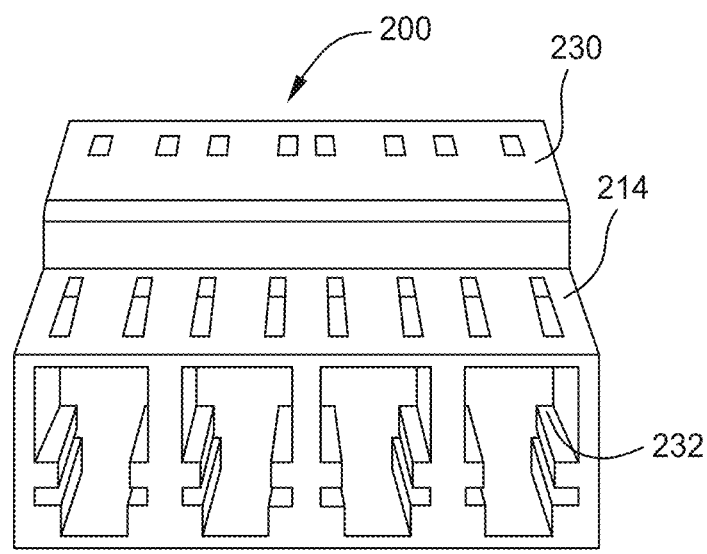

FIGS. 3A and 3B depict a front top view and a rear end top view of the adaptor module 200 that includes four adaptors 250. The partition wall 225 positioned in the interior region 206 defines the connector connection ports 248 in the adaptor 250. Each partition wall 225 has three portions, the first portion 242 and the second portion 238 with the center portion 236 sandwiched therebetween. The first portion 242 formed in each partition wall 225 horizontally defines a first slot 302 and the second portion 238 formed in each partition wall 225 horizontally defines a second slot 304 while the center portion 236 horizontally defines a center slot 306, as shown in the dotted lines, in the connector connection ports 248. The first slot 302, the second slot 304 and the center slot 306 are in open communication forming a passageway that allows the fiber optic connector 100 to be inserted therein. The center slot 306 is configured to receive the connector assemblies 110 from the fiber optic connector 100 while the first slot 302 and the second slot 304 are configured to receive the latch 106 from the fiber optical connector 100. In one example, when the fiber optical connector 100 is in a standard polarity configuration, the latch 106 may be engaged with the first slot 302. In contrast, in a reversed polarity configuration, the position of the latch 106 may be rotated for 180 degrees relative to the position of the latch 106 in a standard or straight polarity configuration. In this regard, the latch 106 may be then engaged with the second slot 304 instead in light of the rotation of the fiber optical connector 100.

In other examples, when standard polarity is configured to have the latch 106 positioned downward, the latch 106 may be engaged in the second slot 304 while the connector assemblies 110 are engaged with the center slot 306. In contrast, when reversed polarity is configured to have the latch 106 flipped-oppositely and positioned upward, the latch 106 may be engaged in the first slot 302 while the connector assemblies 110 are engaged with the center slot 306. A marking section 310 may be formed either at an upper end of the partition wall 225, such as in the first portion 242, or at a lower end of the partition wall 225, such as in the second portion 238, or other suitable places to provide a bold visual indication to the technician of the polarity configurations. In the example depicted in FIG. 3A, the marking section 310 indicates standard polarity of the fiber optical connector 100 when the latch 106 is engaged with the first slot 302. It is noted that the marking section 310 may be formed at different locations of the adapter 250 as needed to facilitate indication of polarity configurations for the technician and operator.

Thus, by configuring the connector connection port 248 with the first slot 302 and the second slot 304 formed adjacent to or connected to the center slot 306, the fiber optical connector 100 with different polarity configurations may be easily installed and inserted into the adaptor 250 without additional direction changes, orientation alternation, or rotation flip either to the fiber optical connector or to the adaptor. When the fiber optical connector 100 is flipped oppositely for polarity change, the two additional slots, such as the first and the second slots 302, 304, formed laterally to the center slot 306, may accommodate different orientations and geometrical configurations of the fiber optical connector 100. Accordingly, the labor and cost for fiber optic management is reduced and the footprint required to place adaptors with different polarity configurations may be reduced.

Figure 4A:
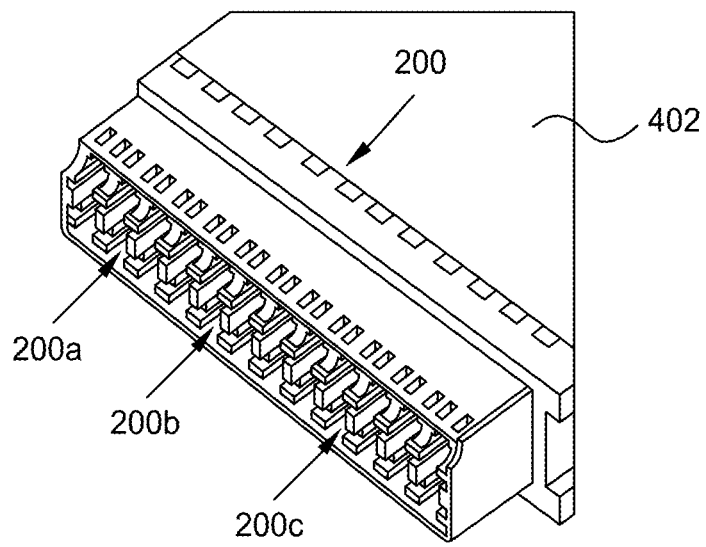
FIG. 4A depicts an example of a fiber optic adaptor module mounted in a chassis according to aspects of the disclosure.

FIG. 4A depicts an example of the adaptor modules 200 positioned in a chassis 402. In the example depicted in FIG. 4A, the chassis 402 is configured to receive multiple adaptor modules 200, shown as 200a, 200b, 200c, aligned in a linear configuration. The chassis 402 may be mounted inside a fiber optic assembly 600 (as shown in FIG. 6). The chassis 402 may be provided in the form of a tray that may be extendable and slidable from the fiber optic assembly 600 like a drawer to allow technicians access to the adaptor 250 provided by the adaptor module 200 and any fiber optical cables connected to the adaptors 250 without removing the adaptor module 200 from the fiber optic assembly 600. In the example depicted in FIG. 4A, three adaptor modules 200a, 200b, 200c are mounted in the chassis 402, thus in total providing 12 adaptors 250 in one chassis 402. It should be understood that in other examples the number of adapters may be varied. It is noted that multiple chassis 402 may be connected side by side, end to end, in multiple arrays or columns, or any suitable configurations as needed.

Figure 4B:
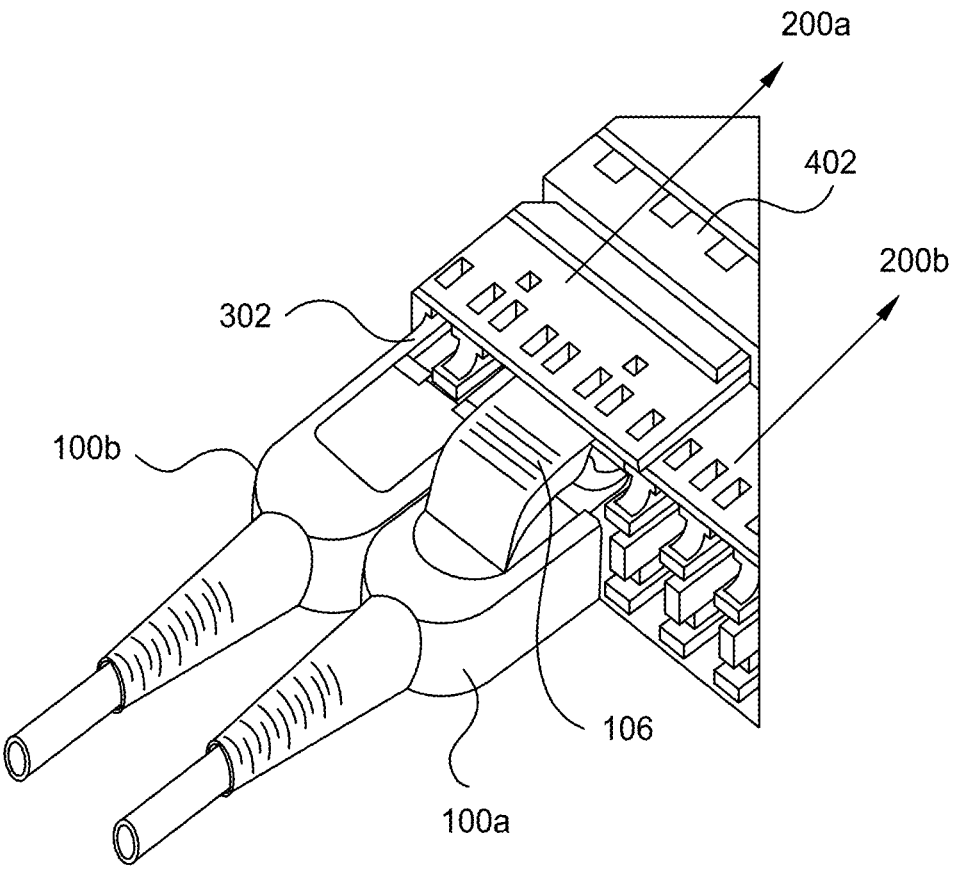
FIG. 4B depicts an example of fiber optic connectors with different polarity configurations connected to the fiber optic adaptor modules in a chassis according to aspects of the disclosure.

FIG. 4B depicts an example of the two fiber optical connectors 100a, 100b with different polarity configurations connected to the adaptor modules 200a mounted in the chassis 402. As both the first and the second slots 302, 304 are defined in the adaptor 250, the two fiber optical connectors 100 with different polarity, such as the first fiber optical connector 100a with the latch 106 positioned upward from the housing and the second fiber optical connector 100b with the latch 106 positioned downward from the housing (not shown in FIG. 4B), may be both engaged in the adaptor module 200 through the first slot 302 and the second slot 304 formed in the adaptor 250.

Figure 5A:
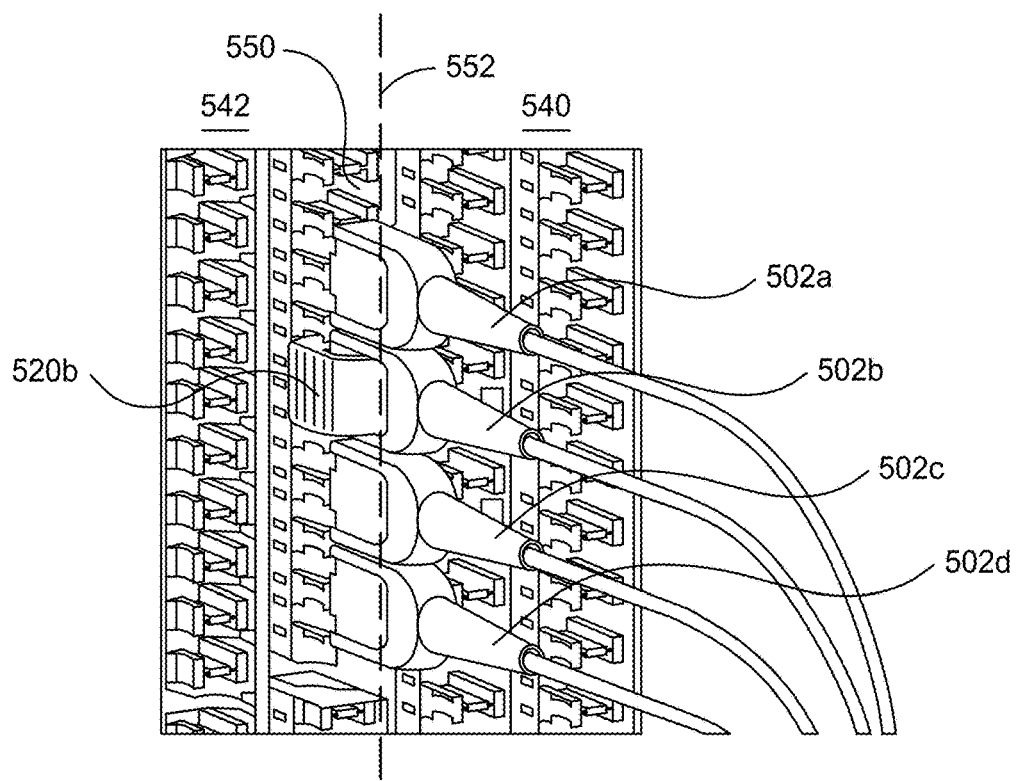
FIGS. 5A-5B depicts examples of fiber optic connectors connected to the fiber optical adaptor modules in a fiber management system according to aspects of the disclosure.
Figure 5B:
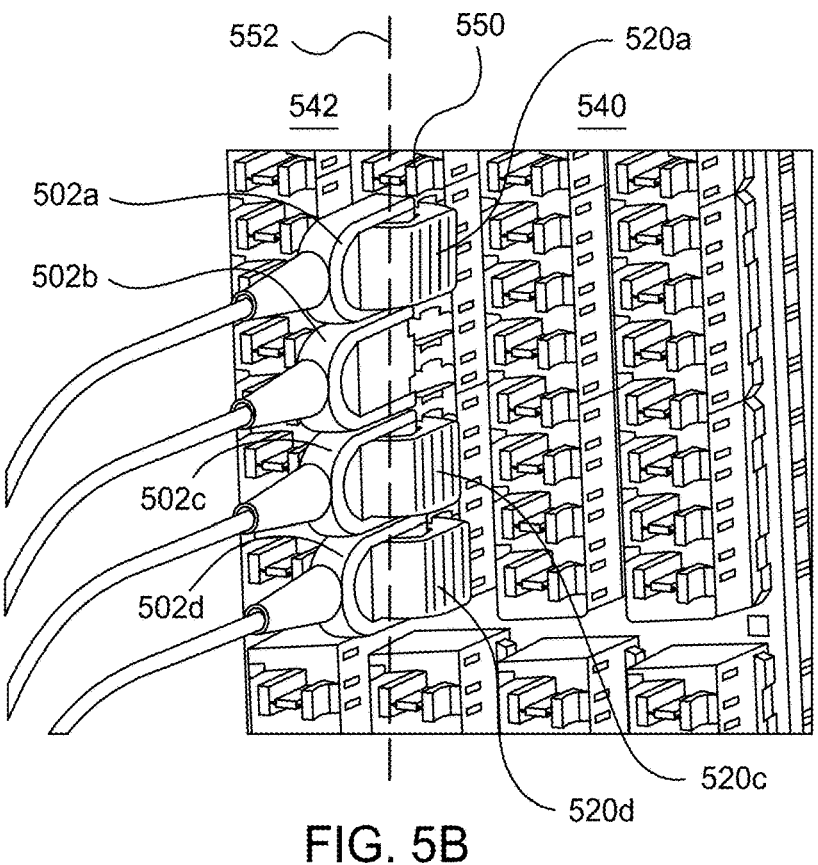

FIGS. 5A and 5B depict an example having four fiber optical connectors 502a, 502b, 502c, 502d connected to an adaptor module 550 in a vertical configuration. FIG. 5A depicts the four fiber optical connectors 502a, 502b, 502c, 502d connected to the adaptor module 550 being viewed from a first side 542 and FIG. 5B depicts the four fiber optical connectors 502a, 502b, 502c, 502d being viewed from a second side 540 opposite to the first side 542 relative to a vertical axis 552 defined by the four fiber optical connectors 502a, 502b, 502c, 502d. In the example depicted in FIG. 5B, the first, third and fourth optical connectors 502a, 502c, 502d are connected to the adaptor module 550 in a first polarity with the latch 520a, 520c, 520d located on the second side 540 relative to the vertical axis 552. In contrast, the second fiber optical connectors 502b is connected to the adaptor module 550 in second polarity with the latch 520b located on the first side 542 relative to the vertical axis 552, as shown in FIG. 5A. As each adaptor in the adaptor module 550 has both a center slot sandwiched and laterally surrounded by the first and the second slots, the fiber optical connectors 502a, 502b, 502c, 502d with either polarity configurations may have the latch 520a, 520b, 520c, 520d engaged with either the first slot or the second slot as needed.

FIG. 6 depicts the fiber optic assembly 600 having three adaptor modules 200a, 200b 200c mounted therein. As discussed above, the partition walls 225 define four connector connection ports 248 in each adaptor modules 200a, 200b 200c. The first, center and second slots defined in the connector connection ports 248 is not shown and is eliminated in this example for ease of description. The marking section 310 is formed on one side of the partition wall 225 to provide a visual indication of the polarity configurations. The fiber optic assembly 600 may be used with a tray for mounting in a patch panel, such as a fiber management system. The fiber optic assembly 600 generally includes a front end 602, a back end 604, generally two flat opposing sides 606, 605 and edges 610 connected therebetween. An alignment rail 620 is disposed along a longitudinal direction of the edges 610. A level 622 is operably coupled to a backend of the alignment rail 620. The level 622 may include additional structures, such as a latch, a finger gripper, or the like, to facilitate retrieve or remove the fiber optic assembly 600 from a tray by a technician or an operator. In some examples, multiple optic assemblies 652, 654 may be stacked together side by side to minimize the gap therebetween so as to maximize the space available in the patch panel for utilization.

Figure 7:
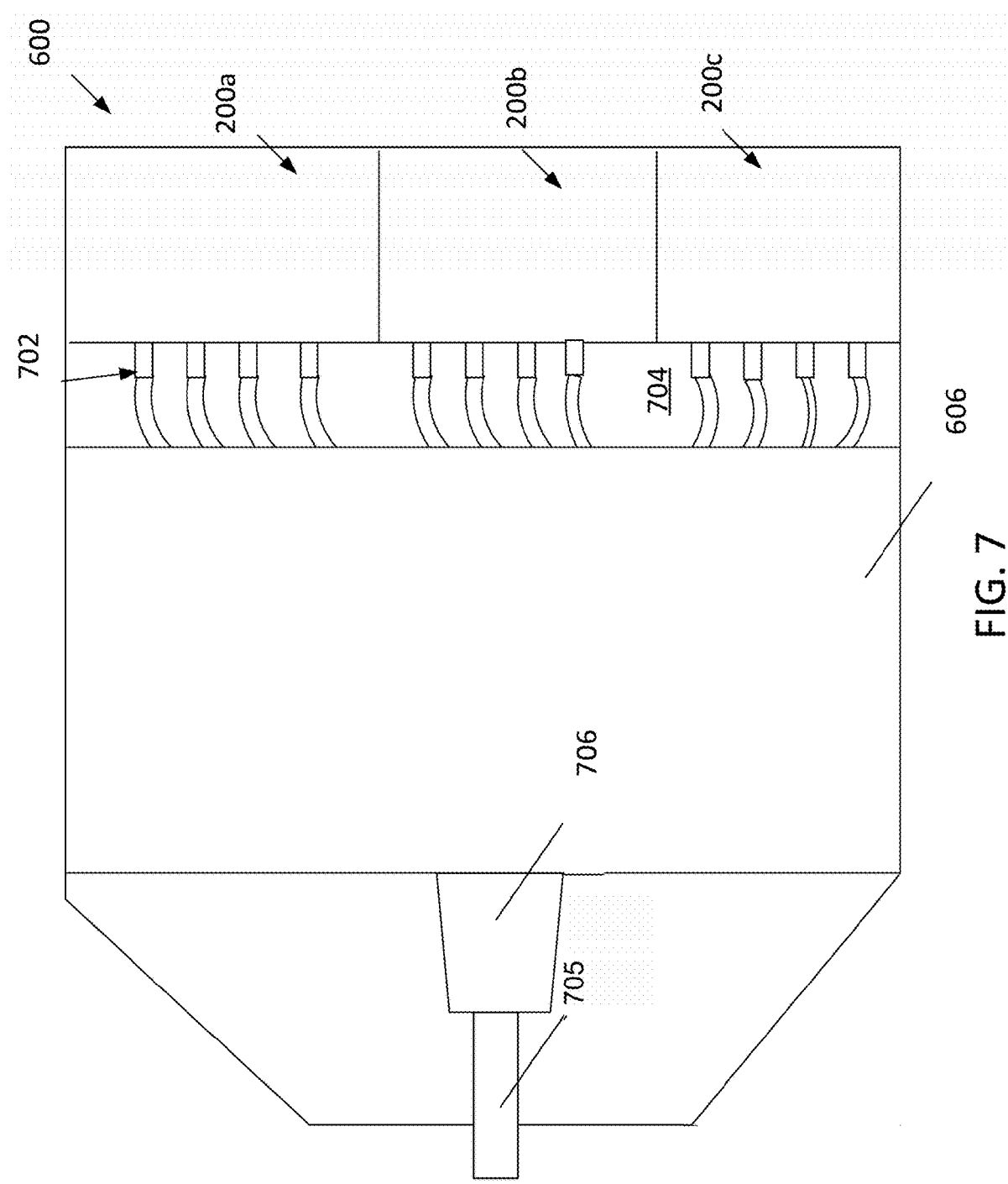
FIG. 7 depicts a top view of an example of the fiber optic assembly of FIG. 6.

FIG. 7 depicts a top view of the fiber optic assembly 600 of FIG. 6. A plurality of cables 702 each connects to a respective fiber optical connector through the adaptors formed in each adaptor modules 200a, 200b, 200c. It is noted that a portion 704 of the side 606 utilized to enclose the adaptor modules 200a, 200b, 200c and the cables 702 is cut off in FIG. 7 to show how the cables 702 are positioned in the interior volume defined in the fiber optic assembly 600 under the side 606. The plurality of cables 702 may be collected in an optical fiber ribbon 705 through an adaptor 706 or a connector for further connection.

Figure 8:
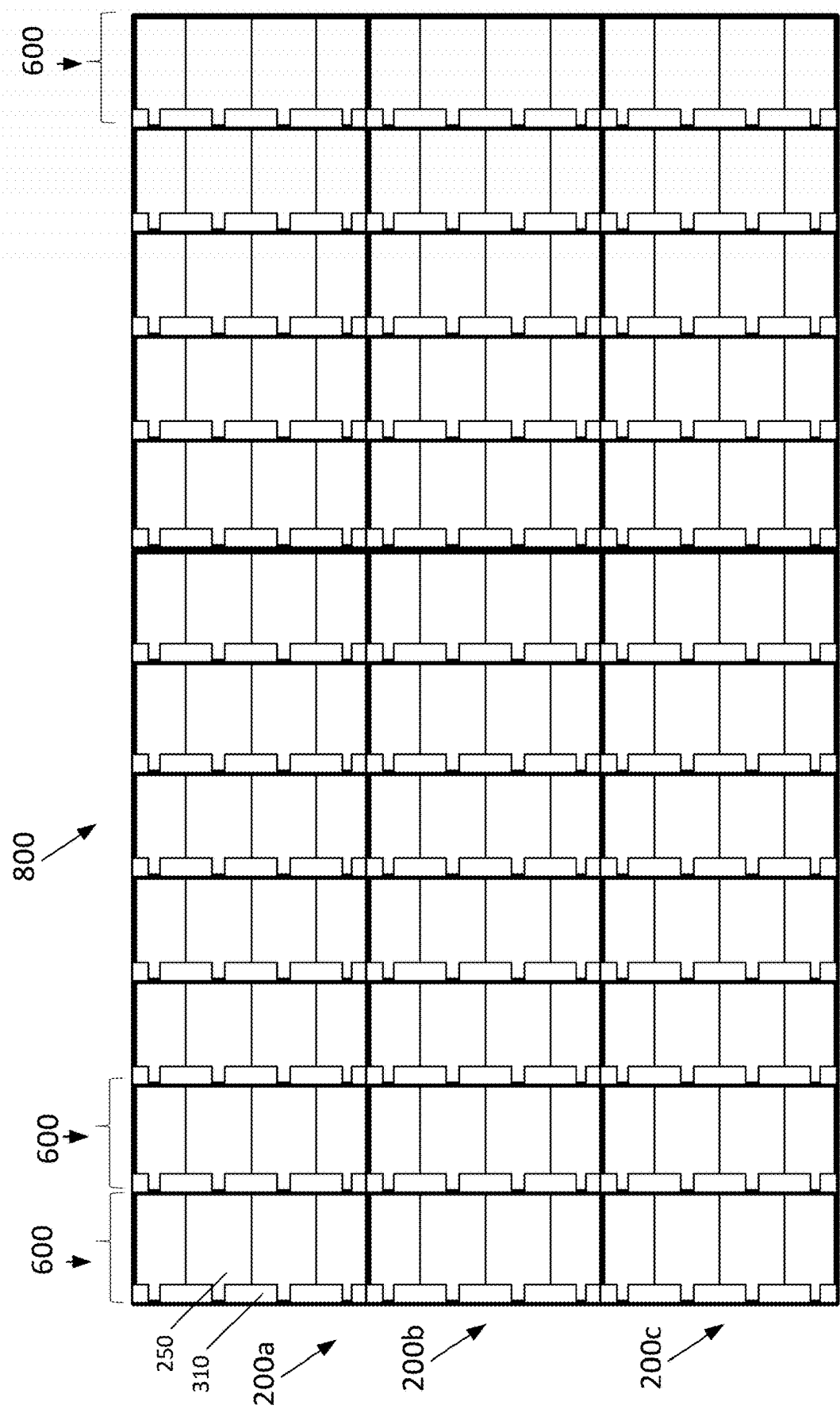
FIG. 8 depicts a front view of a unit panel including multiple fiber optic assemblies according to aspects of the disclosure.

FIG. 8 depicts an example of a stack 800 of multiple fiber optic assemblies 600 connected side by side. In the example depicted in FIG. 8, twelves of the fiber optic assemblies 600 are disposed vertically abutting each other and side by side. Each fiber optic assembly 600 encloses three adaptor module 200a, 200b, 200c and each further encloses four adaptors 250. Thus, the stack 800 of the multiple fiber optic assemblies 600 may provide in total 144 adaptors (e.g., 4×3×12=122), thus providing 144 connector connection ports that allow the fiber optical connectors to be connected thereto. The stack 800 of multiple fiber optic assemblies 600 may be put and installed on a tray slidable and retrievable from in a patch panel to facilitate management, replacement, and arrangement of the connection of the fiber optical connectors.

Figure 9:
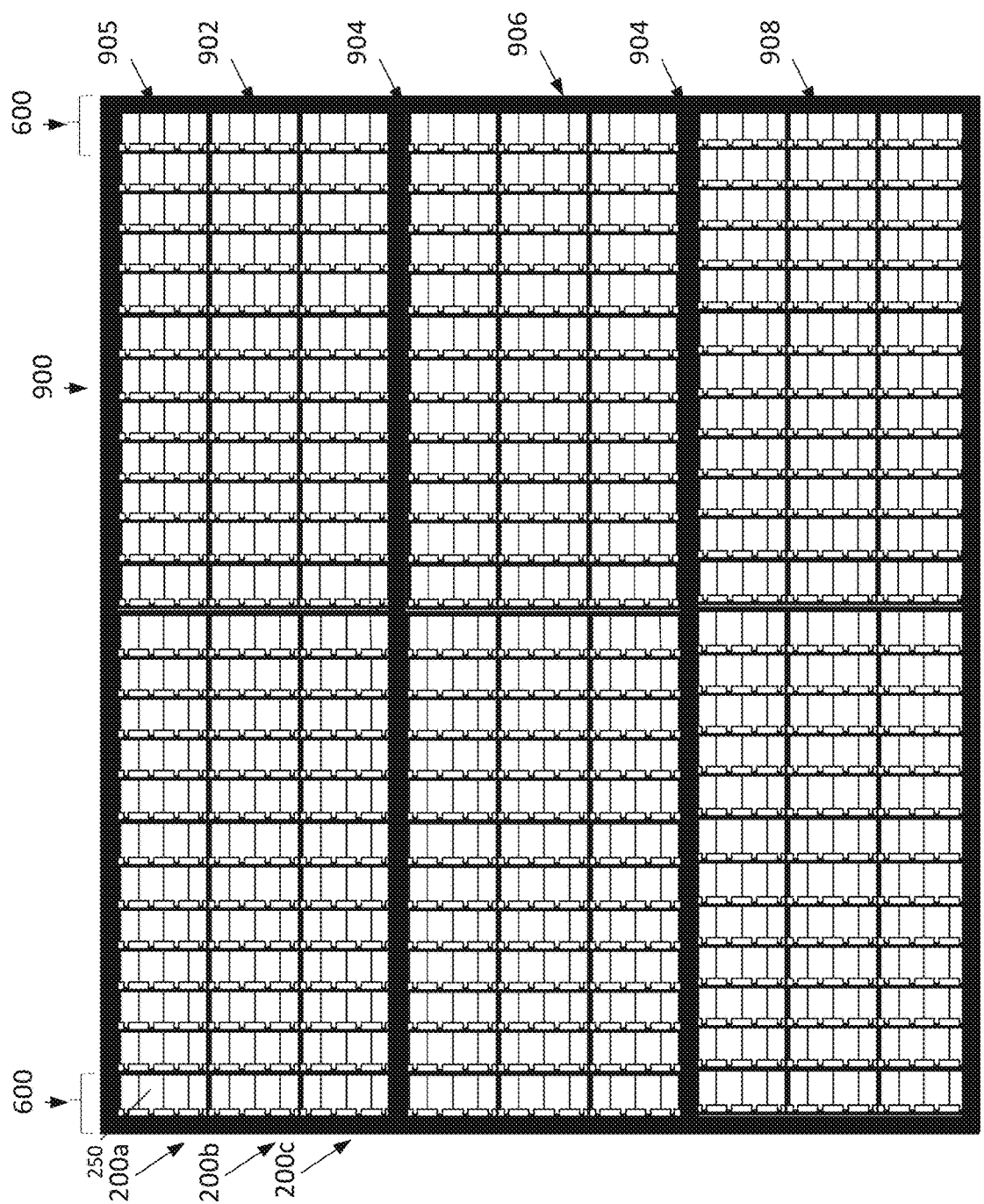
FIG. 9 depicts a front view of a fiber management system including multiple unit panels mounted therein according to aspects of the disclosure

FIG. 9 depicts an example of a front view of multiple stacks of multiple fiber optic assemblies 600 connected side by side and end to end disposed in a fiber management system 900. In the example depicted in FIG. 9, 24 fiber optic assemblies 600 are abutting each other and disposed side by side for in a first row 902 of a patch panel 905. Similarly, another 24 fiber optic assemblies 600 are abutting each other and disposed side by side for in a second row 906 of the patch panel 905. Furthermore, yet another 24 fiber optic assemblies 600 are abutting each other and disposed side by side for in a third row 908 of the patch panel 905. Thus, each row has 288 adaptors (e.g., 4×3×24=288) defined therein and the three rows in total may provide 864 adaptors (e.g., 4×3×24×3=864) in the fiber management system 900, providing a high density fiber management system that may accommodate 864 adaptors in the patch panel 905. Between each row 902, 906, 908, a tray 904 may be disposed therebetween to facilitate retrieve and slide the fiber optic assemblies 600 in each row as a drawer to facilitate management, installation and replacement of the connection of the fiber optical connectors to be connected thereto.

Thus, a dual polarity adaptor for fiber optic interconnection is provided. The adaptor has multiple slots defined in a connector connection port in the adaptor configured to mate with a fiber optic connector with either standard or reversed polarity configurations. In other words, the adaptor can accommodate to mate with the fiber optic connector with any polarity configurations, either standard polarity or reversed polarity configurations. The adaptor may be utilized in a fiber management system, such as a patch panel, to provide connecting ports with high density that can accept fiber optic connectors with both straight polarity and reverse polarity. Thus, the need for ordering different types of adaptors and fiber management system to mate with the fiber optic connectors with different polarity configurations may be eliminated.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A fiber optic adaptor module, comprising:
  a housing having a top wall, a bottom wall, a first sidewall, and a second sidewall connecting the top wall and the bottom wall, the top and bottom walls and the first and second sidewalls defining an interior region in the housing;
  a partition wall disposed in the interior region connected between the top wall and the bottom wall, the partition wall defining one or more adaptors in the housing each having a connector connection port formed therein, wherein the partition wall has a center portion sandwiched between a first portion and a second portion, wherein the first portion is connected to the top wall and the second portion is connected to the bottom wall; and
  a protruding tab formed in the center portion protruding outward relative to an outer edge of the top wall and relative to a first surface and a second surface of the first and the second portion respectively, wherein the first and the second surfaces are vertically aligned.

2. The fiber optic adaptor module of claim 1, wherein the first portion of the partition wall horizontally defines a first slot in the connector connection port and the second portion in the partition wall horizontally defines a second slot in the connector connection port.

3. The fiber optic adaptor module of claim 2, wherein the center portion in the partition wall horizontally defines a center slot between the first and the second slots.

4. The fiber optic adaptor module of claim 3, wherein the center slot is configured to receive a connector assembly from a fiber optic connector.

5. The fiber optic adaptor module of claim 4, wherein the fiber optic connector is a dual polarity optic connector.

6. The fiber optic adaptor module of claim 2, wherein the first and the second slots are configured to receive a latch from a fiber optic connector.

7. The fiber optic adaptor module of claim 1, wherein the protruding tab has a width between about 1 mm and about 100 mm.

8. The fiber optic adaptor module of claim 1, wherein the first and the second surfaces have a curved surface.

9. The fiber optic adaptor module of claim 1, further comprising:
  a front section connected to a rear section, wherein the front section comprises a front surface having the connector connection port formed therein.

10. The fiber optic adaptor module of claim 9, wherein the rear section comprises one or more cable connection ports formed therein.

11. The fiber optic adaptor module of claim 9, wherein the rear section is removable from the front section.

12. The fiber optic adaptor module of claim 9, wherein the cable connection ports are in connection with the connector connection port in the housing.

13. The fiber optic adaptor module of claim 1, wherein three partition walls are formed in the interior region, defining four adaptors in the housing.

14. The fiber optic adaptor module of claim 1, further comprising:
  a marking section formed at one end of the partition wall.

15. An adaptor, comprising:
  a housing having a top wall, a bottom wall, a first sidewall, and a second sidewall connecting the top wall and the bottom wall, the top and bottom walls and the first and second sidewalls defining an interior region in the housing, wherein the first and the second walls each has a center portion sandwiched between a first portion and a second portion, wherein the first portion is connected to the top wall and the second portion is connected to the bottom wall; and
  a protruding tab formed in the center portion protruding outward relative to an outer edge of the top wall and relative to a first surface and a second surface of the first and the second portion respectively, wherein the first and the second surfaces are vertically aligned, wherein the first and the second surface are curved and geometrically identical.

16. The adaptor of claim 15, wherein the adaptor is configured to mate with a dual polarity optic connector with either standard polarity configuration or reversed polarity configuration.

17. The adaptor of claim 15, wherein the first portion horizontally defines a first slot and the second portion in the partition walls horizontally defines a second slot.

18. The adaptor of claim 17, wherein the center portion horizontally defines a center slot between the first and the second slots.

19. The adaptor of claim 18, wherein the first and the second slots are configured to receive a latch from a fiber optic connector and the center slot is configured to receive a connector assembly from the fiber optic connector.

20. A method for connecting a fiber optic connector to an adaptor, comprising:
   mating a connector assembly of a fiber optical connector to a center slot of a connector connection port defined in an adaptor; and
   mating a latch of the fiber optical connector to a first slot of the connector connection port in the adaptor, wherein the first slot is disposed on a first side of the center slot and vertically above the center slot in the connector connection port, leaving a second slot disposed on a second side of the center slot unconnected in the connector connection port and the second slot is vertically below the center slot.

\* \* \* \* \*